(12) United States Patent  
Hwang et al.

(10) Patent No.: US 8,959,554 B2  
(45) Date of Patent: Feb. 17, 2015

(54) APPARATUS AND METHOD FOR TRANSMITTING AND RECEIVING SIGNALING INFORMATION IN A DIGITAL BROADCASTING SYSTEM

(71) Applicant: Samsung Electronics Co., Ltd., Gyeonggi-do (KR)

(72) Inventors: Sung-Oh Hwang, Gyeonggi-do (KR); Alain Mourad, Middlesex (GB)

(73) Assignee: Samsung Electronics Co., Ltd (KR)

( * ) Notice: Subject to any disclaimer, the term of this patent is extended or adjusted under 35 U.S.C. 154(b) by 27 days.

(21) Appl. No.: 13/870,477

(22) Filed: Apr. 25, 2013

(65) Prior Publication Data

US 2013/0291027 A1    Oct. 31, 2013

Related U.S. Application Data

(60) Provisional application No. 61/638,169, filed on Apr. 25, 2012.

(51) Int. Cl.
*H04N 7/16* (2011.01)
*H04N 21/61* (2011.01)
*H04N 21/643* (2011.01)
*H04N 21/2362* (2011.01)

(52) U.S. Cl.
CPC ..... *H04N 21/6131* (2013.01); *H04N 21/64322* (2013.01); *H04N 21/2362* (2013.01); *H04N 21/643* (2013.01)
USPC .............. 725/62; 725/69; 725/70; 725/71; 725/109

(58) Field of Classification Search
USPC ........................ 725/62, 69–71, 109
See application file for complete search history.

(56) References Cited

U.S. PATENT DOCUMENTS

| 8,687,635 | B2* | 4/2014 | Lee et al. ............ 370/390 |
| 2009/0079878 | A1 | 3/2009 | Lee et al. |
| 2009/0094356 | A1* | 4/2009 | Vare ................ 709/223 |
| 2010/0290459 | A1 | 11/2010 | Lee et al. |
| 2011/0051745 | A1 | 3/2011 | Lee et al. |
| 2012/0076127 | A1 | 3/2012 | Mourad et al. |
| 2012/0331508 | A1* | 12/2012 | Vare et al. .......... 725/50 |
| 2013/0279380 | A1* | 10/2013 | Hong et al. ........ 370/310 |
| 2014/0029502 | A1* | 1/2014 | Hong et al. ........ 370/312 |

FOREIGN PATENT DOCUMENTS

WO    WO 2011/105096    9/2011

* cited by examiner

*Primary Examiner* — Mulugeta Mengesha
(74) *Attorney, Agent, or Firm* — The Farrell Law Firm, P.C.

(57) ABSTRACT

A method for transmitting signaling information for reception of a broadcast service in a digital broadcasting system is provided. The method includes generating signaling information that includes a network information table indicating information about a transport network over which broadcast service data is transmitted, and a service information table indicating at least one broadcast service and information about at least one Physical Layer Pipe mapped to the at least one broadcast service, and transmitting the signaling information in a Generic Stream Encapsulation packet.

28 Claims, 8 Drawing Sheets

APPARATUS AND METHOD FOR TRANSMITTING AND RECEIVING SIGNALING INFORMATION IN A DIGITAL BROADCASTING SYSTEM

PRIORITY

This application claims priority under 35 U.S.C. §119(e) to a United States patent application filed in the United States Patent and Trademark Office on Apr. 25, 2012 and assigned Ser. No. 61/638,169, the contents of which are incorporated herein by reference.

BACKGROUND OF THE INVENTION

1. Field of the Invention

The present invention relates generally to a digital broadcasting system, and more particularly, to an apparatus and method which transmits and receiving signaling information for reception of broadcast services in a digital broadcasting system.

2. Description of the Related Art

Existing broadcasting systems or mobile communication systems may provide a mobile broadcasting service to mobile terminals operating in the current mobile communication and broadcasting environment. The second-generation mobile broadcast standards for the mobile broadcasting service have been established due to the full-fledged standardization and service commercialization since the mid-2000s.

An example of the second-generation mobile broadcast standard includes Next Generation Handheld (NGH), the standard of which has been established by Digital Video Broadcasting (DVB), which is the European digital broadcast standard organization. The NGH includes a Moving Picture Experts Group (MPEG)-2 Transport Stream (TS) profile, which uses the terrestrial broadcast networks, and an Internet Protocol (IP) profile for interworking with the IP networks. The MPEG-2 TS profile provides service information and information about the network over which the service is delivered, using Program Specific Information/Service Information (PSI/SI) provided by TS. However, the IP profile needs to provide service information and information about the network over which the service is delivered, using a separate method, since it does not use MPEG-2 TS.

A DVB-NGH system includes a service provider, a network provider, and receivers, and needs to provide information required for a broadcast service provided by the service provider and information required for a broadcast service provided by the network provider. However, when a broadcast service is delivered using Generic Stream Encapsulation (GSE), there is a need in the art for a method for efficiently providing information required for the broadcast service.

SUMMARY OF THE INVENTION

An aspect of the present invention is to address at least the above-mentioned problems and/or disadvantages and to provide at least the advantages described below. Accordingly, an aspect of the present invention is to provide an apparatus and method capable of properly transmitting information required for reception of a broadcast service when the broadcast service is provided using GSE in a digital broadcasting system.

Another aspect of the present invention is to provide an apparatus and method for efficiently transmitting and receiving signaling information for reception of a broadcast service in a digital broadcasting system.

In accordance with an aspect of the present invention, there is provided a method which transmits signaling information for reception of a broadcast service in a digital broadcasting system. The method includes generating signaling information that includes a network information table indicating information about a transport network over which broadcast service data is transmitted, and a service information table indicating at least one broadcast service and information about at least one Physical Layer Pipe (PLP) mapped to the at least one broadcast service, and transmitting the signaling information in a GSE packet.

In accordance with another aspect of the present invention, there is provided an apparatus which transmits signaling information for reception of a broadcast service in a digital broadcasting system. The apparatus includes a signaling information generator which generates signaling information that includes a network information table indicating information about a transport network over which broadcast service data is transmitted, and a service information table indicating at least one broadcast service and information about at least one PLP mapped to the at least one broadcast service, and a transmitter which transmits the signaling information in a GSE packet.

In accordance with another aspect of the present invention, there is provided a method which receives signaling information for reception of a broadcast service in a digital broadcasting system. The method includes receiving signaling information in a GSE packet from a transmitting apparatus, analyzing the signaling information, and extracting, from the signaling information, a network information table indicating information about a transport network over which broadcast service data is transmitted, and a service information table indicating at least one broadcast service and information about at least one PLP mapped to the at least one broadcast service.

In accordance with another aspect of the present invention, there is provided an apparatus which receives signaling information for reception of a broadcast service in a digital broadcasting system. The apparatus includes a receiver which receives signaling information in a GSE packet, and a controller which analyzes the signaling information, and extracting, from the signaling information, a network information table indicating information about a transport network over which broadcast service data is transmitted, and a service information table indicating at least one broadcast service and information about at least one PLP mapped to the at least one broadcast service.

BRIEF DESCRIPTION OF THE DRAWINGS

The above and other aspects, features and advantages of embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE INVENTION

Embodiments of the present invention will be described with reference to the accompanying drawings. The following description includes various specific details to assist in that understanding but these are to be regarded as merely examples. Accordingly, those of ordinary skilled in the art will recognize that various changes and modifications of the embodiments described herein can be made without departing from the scope and spirit of the invention. In addition, descriptions of well-known functions and constructions may be omitted for the sake of clarity and conciseness.

The terms and words used in the following description and claims are not limited to their dictionary meanings, but, are merely used by the inventor to enable a clear and consistent understanding of the invention. Accordingly, it should be apparent to those skilled in the art that the following description is provided for illustration purposes only and does not limit the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following detailed description, although typical embodiments will be described based on the technologies of DVB-GSE and Open Mobile Alliance Browser and Content Mobile Broadcast (OMA BAC BCAST), these embodiments will not restrict the scope, to which the present invention is applicable.

Figure 1:
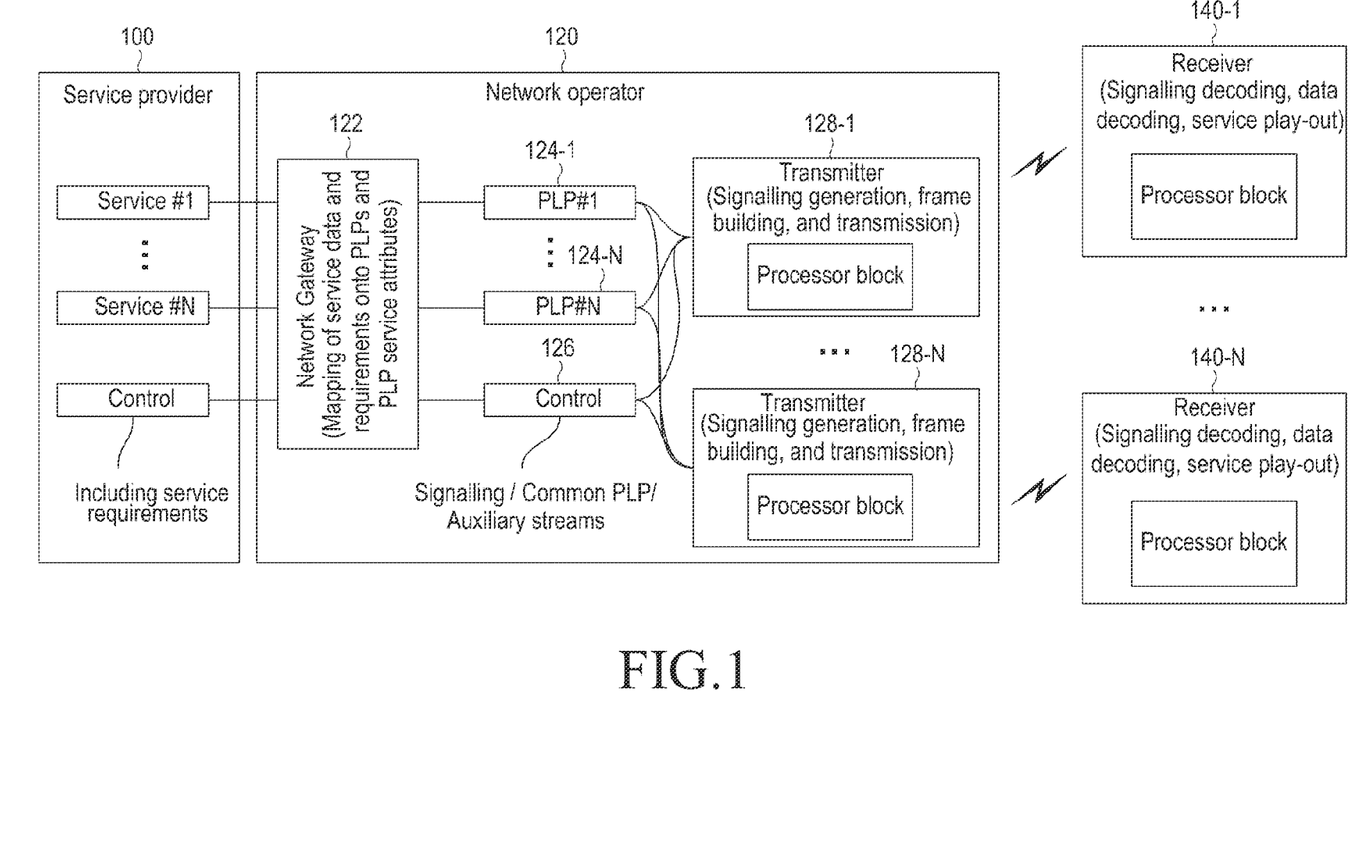
FIG. 1 illustrates a configuration of a DVB-NGH system.

FIG. 1 illustrates a configuration of a DVB-NGH system.

A service provider 100 provides a broadcast service and control information required for reception of the broadcast service, to a network operator 120. The network operator 120 maps broadcast services, which are received from the service providers 100 through a network gateway 122, to at least one Physical Layer Pipe (PLP), which is a logical channel used in a physical layer that collectively transmits broadcast services having the same physical transmission characteristics.

The network operator 120 combines the information required for reception of broadcast services transmitted on the PLP with the information required for reception of a broadcast service provided by the service provider 100, and provides this combination as information that receivers require for reception of the broadcast service. Broadcast services and control information corresponding to the PLPs 124-1 . . . 124-N are transferred to their associated transmitters 128-1 . . . 128-N, where they are converted into broadcast physical signals and then transmitted to receivers 140-1 . . . 140-N in the corresponding areas. The receiver receives the control information and broadcast services, and provides the broadcast services to the user.

Figure 2A:
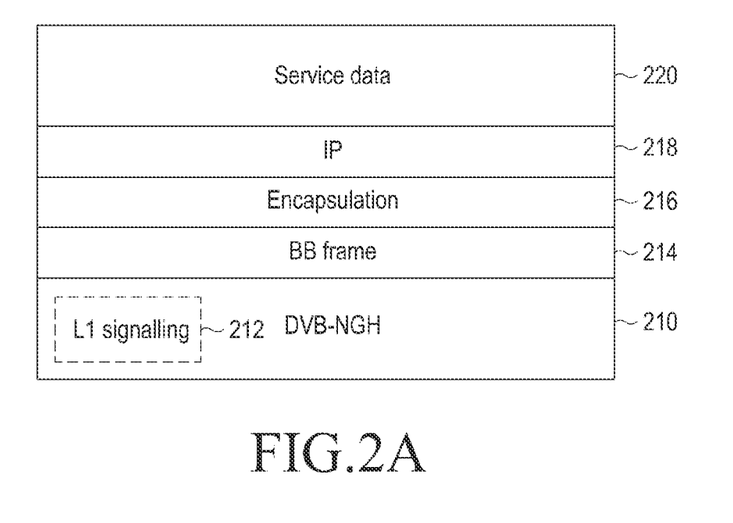
FIG. 2A illustrates an example of a protocol structure of DVB-NGH.

FIG. 2A illustrates an example of a protocol structure of DVB-NGH.

A DVB-NGH layer 210, a physical layer of NGH, conveys a bit stream using an appropriate modulation scheme, and conveys a bit stream and Layer-1 (L1) signaling 212. The L1 signaling 212 provides information required in a physical layer, such as information based on which a terminal can find the DVB-NGH network.

A BaseBand (BB) frame layer 214 is an upper layer of the physical layer, and data conveyed in the upper layer is generated as a BB frame through an encapsulation process.

An encapsulation layer 216 standardizes (or encapsulates) upper-layer data using MPEG-2 TS, or standardizes data incoming from the upper layer using DVB-GSE. In the present invention, it will be assumed that DVB-GSE is used.

An IP layer 218 conveys service data and information required for the service in the form of IP packet.

Service data 220 is configured in an upper layer of the IP layer 218. The service data 220 may be, for example, a service guide, and an electronic service guide.

Figure 2B:
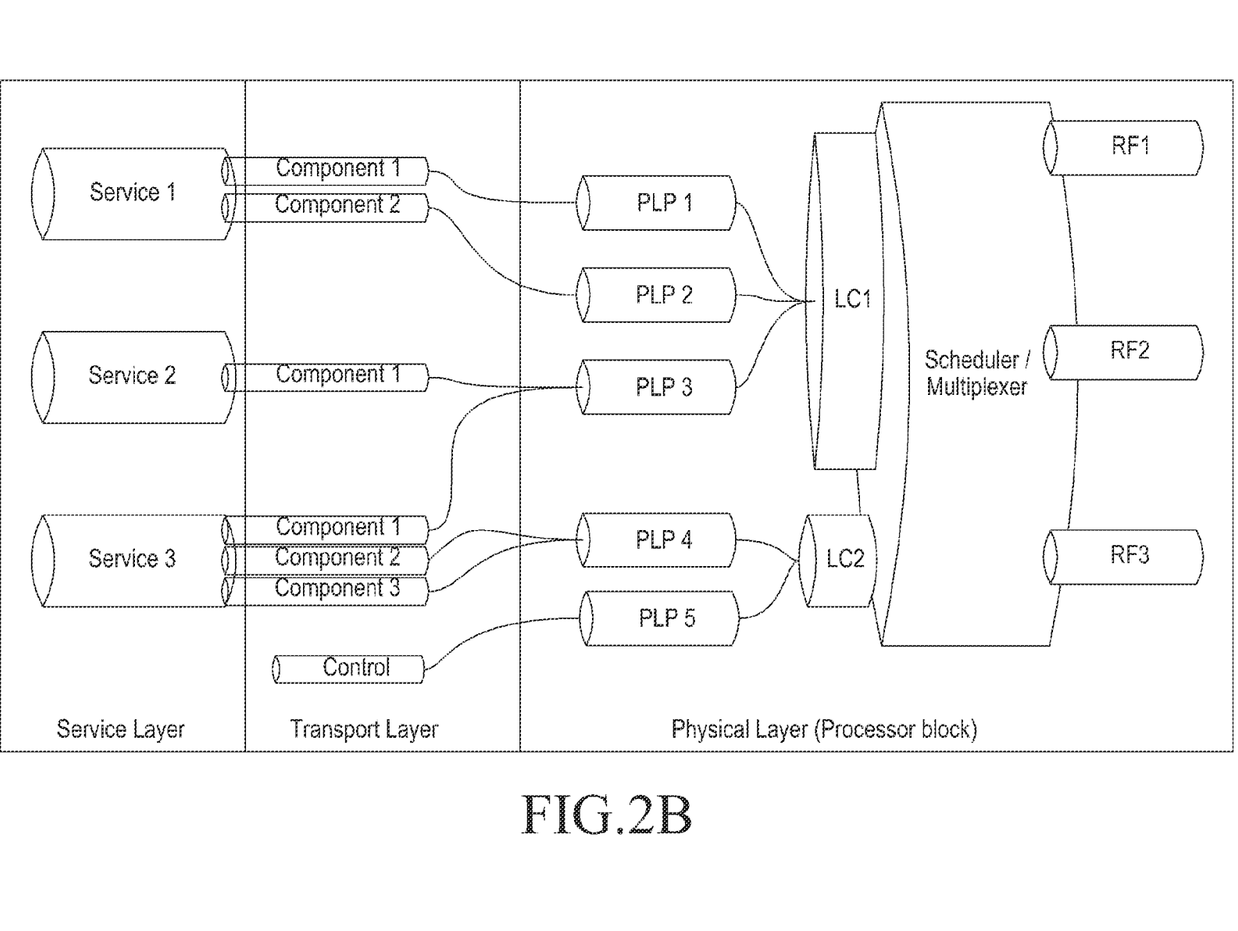
FIG. 2B illustrates another example of a protocol structure of DVB-NGH.

FIG. 2B illustrates another example of a protocol structure of DVB-NGH.

A protocol of DVB-NGH includes a service layer, a transport layer and a physical layer.

The service layer processes a service such as a video channel that is provided to a user, and the processed service is transferred to the transport layer. The service may be referred to as a broadcast service.

The transport layer maps the broadcasting service components, which are delivered by the broadcast service, to PLPs.

The physical layer may convey a service such as a video channel that is provided to a user.

Figure 3:
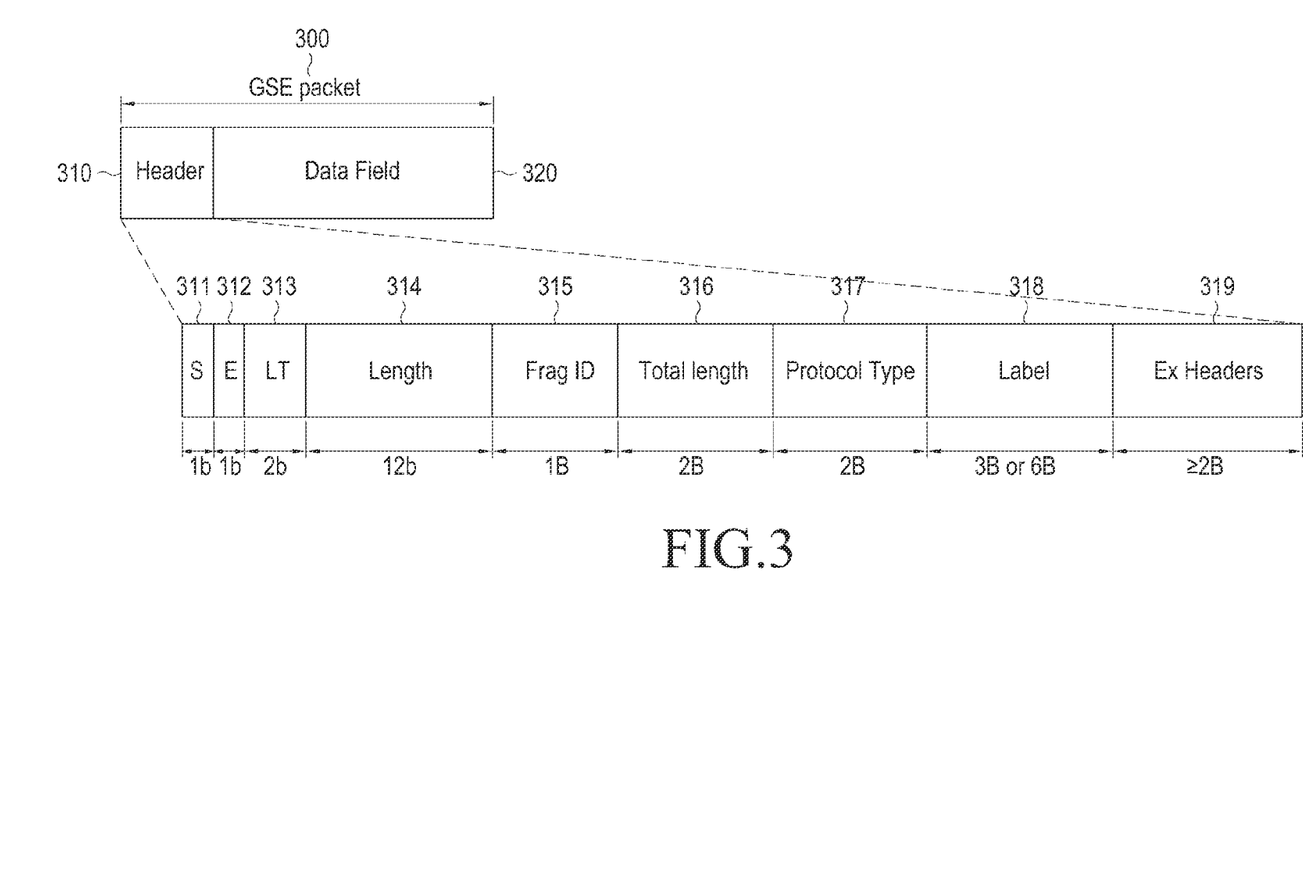
FIG. 3 illustrates a DVB-GSE structure applied to an embodiment of the present invention.

FIG. 3 illustrates a DVB-GSE structure applied to an embodiment of the present invention.

A GSE packet 300 includes a header 310 that provides information required for processing of the GSE packet 300, and a data field 320 that conveys actual data. A structure of the header 310 includes Start (S) indicator 311, End (E) indicator 312, Label Type (LT) indicator 313, GSE Packet Length 314, Frag ID 315, Protocol Data Unit (PDU) Total Length 316, Protocol Type 317, Label 318, and Extension Header 319.

The Start indicator 311, as a 1-bit indicator, indicates that the GSE packet 300 conveys the first fragment of an upper-layer PDU, if its value is '1'. The End indicator 312, as a 1-bit indicator, indicates that the GSE packet 300 conveys the last fragment of the upper-layer PDU, if its value is '1'. For the GSE packet 300 conveying intermediate fragments of the upper-layer PDU, its Start indicator 311 and End indicator 312 have a value of '0' and '0', respectively.

The Label Type indicator 313, as a 2-bit indicator, indicates the type of the label that is an address of a GSE layer, which is used in the GSE packet 300. The label is used by receivers, to distinguish a GSE packet to be received by the receivers. The Label Type indicator 313 indicates that a 6-byte length label (an address in the GSE layer) is used, if its value is '00'. The Label Type indicator 313 indicates that a 3-byte length label is used, if its value is '01'. The Label Type indicator 313 indicates that no label is used, if its value is '10'. The Label Type indicator 313 indicates that a label is reused, if its value is '11'. If its value is '11', the Label Type indicator 313 is used to prevent waste resulting from the repeated transmission of the label, but the first GSE packet of the BB frame, in which GSE packets are transmitted, needs to have label information in the header, and its succeeding GSE packets use a value of '11', thereby preventing the repeated transmission of the label.

Even in GSE, padding may be needed, since the upper-layer PDU is shorter in length than the BB frame. Transmission of padding data may be indicated by a combination of values of the Start indicator 311, the End indicator 312, and the Label indicator 318. If the values of the Start indicator 311, the End indicator 312, and the Label indicator 318 are all '0', it indicates that padding bits are included in the data field 320 of the GSE packet 300.

The GSE Packet Length 314, which has a 12-bit length, indicates in bytes the length of the GSE packet 300 beginning from the first bit following the GSE Packet Length 314, to the last bit of the data field 320, or to the last bit of the data field 320 just ahead of the padding bits. The GSE Packet Length 314 may indicate a length of a maximum of 4096 bytes.

The Frag ID 315 is used to identify fragmented PDUs. In other words, fragmented PDUs, which are fragmented from one PDU and conveyed in multiple GSE packets 300, all have the same identifier value.

The PDU Total Length 316 indicates the total length of the PDU that is conveyed over GSE packets, and has a 16-bit length.

The Protocol Type 317 is a 16-bit field that indicates a protocol type of the PDU that is conveyed in the data field 320 of the GSE packet 300, and the presence of an extension header. Type 1 (0 to 1535) indicates the presence and type of an extension header, and the PDU type, and Type 2 (1536 to 65535) indicates a PDU protocol type.

The Label 318 is a field in which a value of the above-described label is conveyed, and indicates a 6 or 3-type length. The Extension Header 319 is used to provide additional information in addition to the information provided by the header 310.

Figure 4:
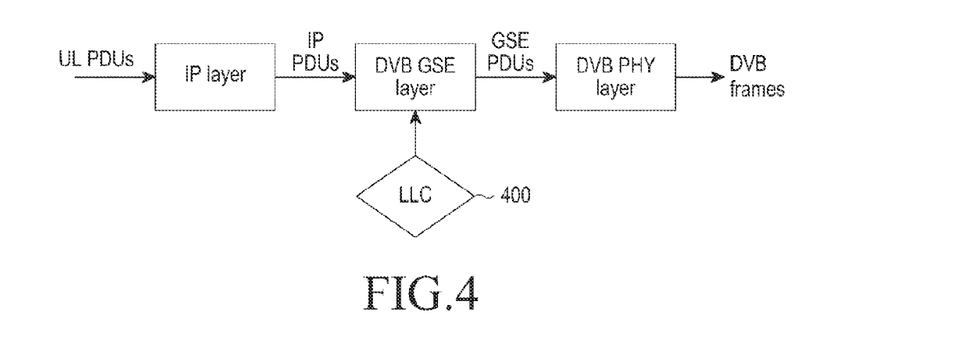
FIG. 4 illustrates an example of an NGH protocol according to the first embodiment of the present invention.

FIG. 4 illustrates an example of an NGH protocol according to a first embodiment of the present invention.

The first embodiment of the present invention discloses a manner in which to provide information about a broadcast service that is provided by NGH using the GSE packet described in conjunction with FIG. 3.

The information about a broadcast service is defined in two types: network information providing information about the NGH network, i.e., about the frequency and multiplexer, and service information providing information about broadcast services and PLPs, to which the broadcast services are mapped and on which they are transmitted. The network information and the service information are provided in the form of an NIT and an SIT, respectively.

Reference will now be made to FIGS. 4 to 7 to describe how the NIT and SIT are transported.

An LLC illustrated in FIG. 4 efficiently transports an IP packet to be transmitted by GSE, and control information required to efficiently transport the IP packet to be transmitted by GSE. In FIGS. 4 to 7, the GSE packets conveying NIT and SIT are generated under control of the LLC 400.

Figure 5:
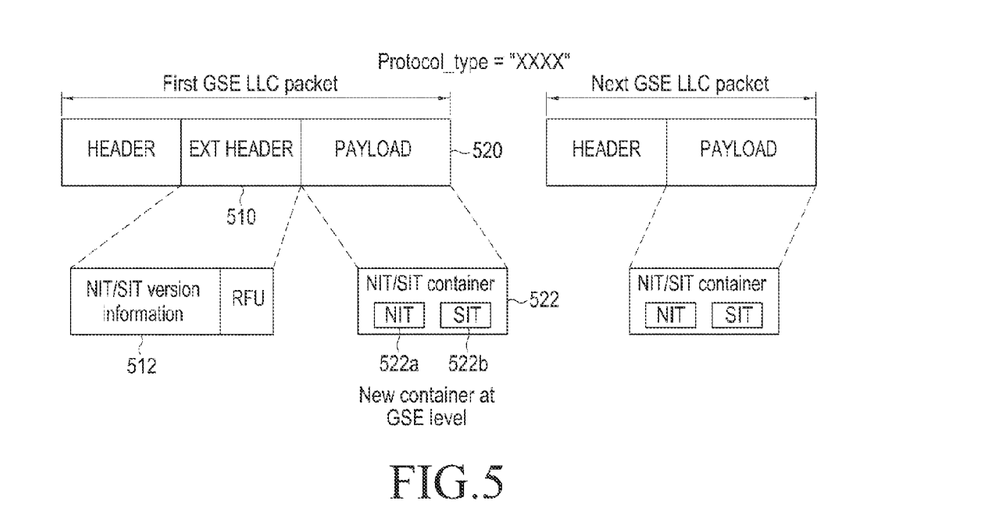
FIG. 5 illustrates a frame structure for transporting a Network Information Table (NIT) and Service information Table (SIT) using a GSE Logical Link Control (LLC) packet according to a first embodiment of the present invention.

FIG. 5 illustrates a frame structure for transporting an NIT and SIT using a GSE LLC packet according to a first embodiment of the present invention.

The first embodiment of the present invention sets up an extension header 510 in a GSE LLC packet, and then provides NIT/SIT version information 512 conveyed in a payload 520, to the extension header 510. The first embodiment of the present invention sets up the Payload 520 in a GSE LLC packet, the Payload 520 includes NIT/SIT container 522 at GSE level. The NIT/SIT container 522 includes NIT 522a and SIT 522b.

As illustrated in conjunction with FIG. 3, Type 1 of the protocol type of the GSE packet provides information indicating the presence/absence of an extension header and the type of the information provided with the extension header. Therefore, any unused value among the values of 0 to 1535 is assigned to the protocol type of the GSE packet, allowing a receiver receiving the GSE packet to determine that the NIT and SIT are conveyed in a payload part of the GSE packet and version information of NIT/SIT is present in the extension header.

The NIT/SIT version information 512 allows the receiver to obtain version information of the NIT/SIT before analyzing the NIT/SIT. Therefore, the receiver may not process a newly received NIT/SIT if it is the same as the previously received NIT/SIT information. If the NIT/SIT information is greater in amount than one GSE packet, multiple GSE packets may be used. As illustrated in FIG. 5, if multiple GSE packets are used, an extension header may be conveyed in the first GSE LLC packet. However, the first embodiment is not limited to this method.

Figure 6:
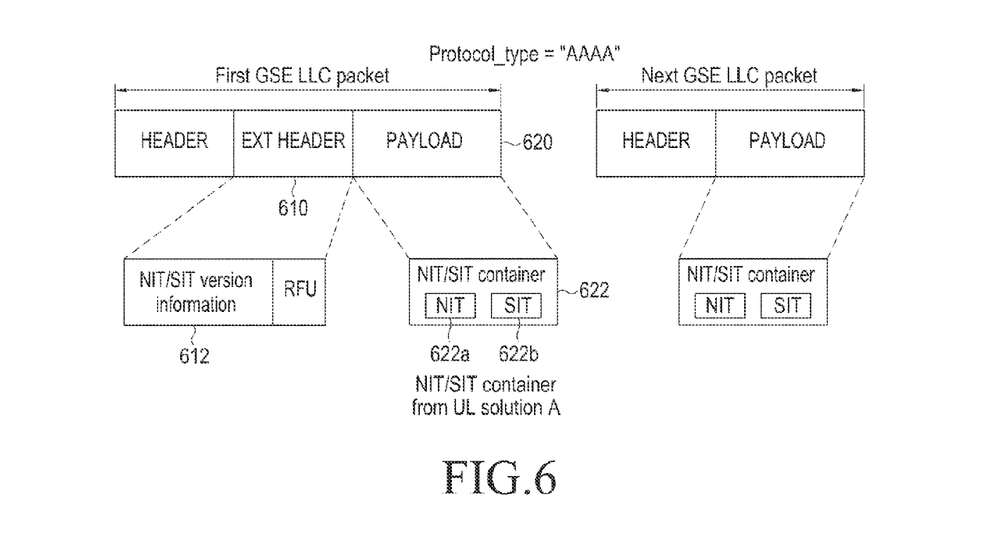
FIG. 6 illustrates a frame structure for transporting NIT and SIT using a GSE LLC packet according to a second embodiment of the present invention.

FIG. 6 illustrates a frame structure for transporting an NIT and SIT using a GSE LLC packet according to a second embodiment of the present invention.

The second embodiment of the present invention sets up an extension header 610 in a GSE LLC packet, and then provides NIT/SIT version information 612 conveyed in a payload 620, to the extension header 610. The second embodiment of the present invention sets up the Payload 620 in a GSE LLC packet, and the Payload 620 includes the NIT/SIT container 622 from an UpLink (UL) solution. The NIT/SIT container 622 includes NIT 622a and SIT 622b.

In contrast with the first embodiment, the SIT and NIT in the second embodiment are transported by a service information provider of the upper layer. For example, the service information provider of the upper layer may provide an electronic service guide such as a service guide of OMA BCAST. In the second embodiment of the present invention, the NIT and SIT may not be directly inserted into the GSE LLC packet, but instead, they may be inserted into a container such as a Service Guide Delivery Descriptor (SGDD) of the OMA BCAST Service Guide function.

The second embodiment is advantageous over the first embodiment in that the GSE layer does not need to directly generate NIT/SIT information. In other words, OMA BCAST Service Guide having a basic function of providing service information creates the NIT and SIT, and transfers the NIT/SIT in an SGDD that provides basic information required for reception of a service guide, thereby allowing the receiver to obtain the most basic information required for NGH broadcast service once it receives the SGDD. In other words, in the first embodiment, after receiving a GSE LLC packet, a terminal analyzes the NIT and SIT, acquires SGDD of OMA BCAST depending on the information indicated by the NIT/SIT, acquires information for reception of a service guide from the SGDD, receives the service guide using the acquired information, and receives an NGH broadcast service based on the received service guide.

In the second embodiment, since the NIT/SIT is directly conveyed in the SGDD, a receiver analyzes the NIT/SIT and other information in the SGDD immediately after it receives a GSE LLC packet carrying the SGDD. Then, the receiver receives a service guide and receives an NGH broadcast service based on the received service guide. Although the second embodiment is similar to the first embodiment in terms of the basic structure, the protocol type of GSE_LLC needs to be set as a value indicating that OMA BCAST SGDD is contained in a payload, and the set value may fall within a range of 0 to 1535. Version information of the NIT/SIT is provided in an extension header 610 to prevent unnecessary NIT/SIT analysis.

Figure 7:
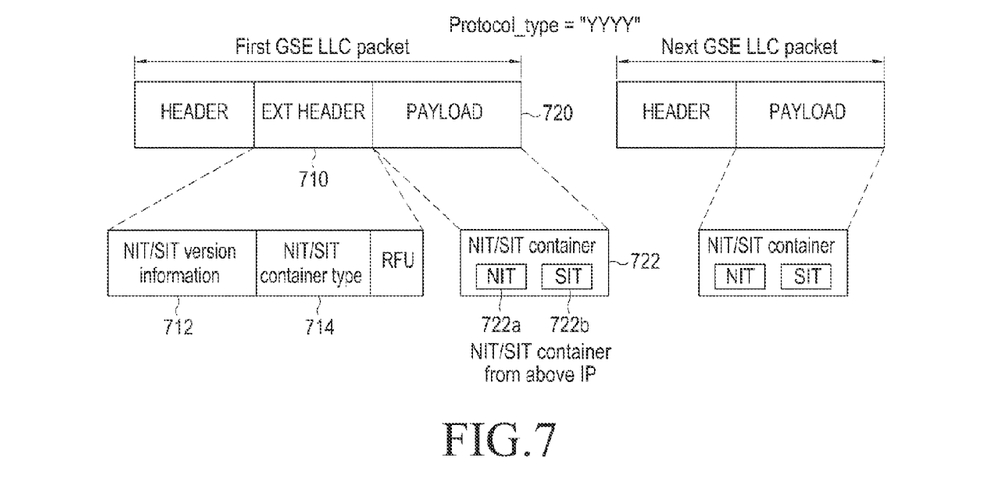
FIG. 7 illustrates a frame structure for transporting NIT and SIT using a GSE LLC packet according to a third embodiment of the present invention.

FIG. 7 illustrates a frame structure for transporting an NIT and SIT using a GSE LLC packet according to a third embodiment of the present invention.

The third embodiment of the present invention sets up an extension header 710 in a GSE LLC packet, and then provides NIT/SIT version information 712 conveyed in a payload 720, to the extension header 710. The third embodiment of the present invention sets up the payload 720 in a GSE LLC packet, and the Payload 720 includes the NIT/SIT container 722 from the IP. The NIT/SIT container 722 includes NIT 722a and SIT 722b.

Compared to the second embodiment of the present invention, the third embodiment of the present invention is an example of when the service guide unit conveying the NIT/SIT varies as every service provider has its own solution it uses in generating a service guide. By inserting NIT/SIT container information into an extension header of the GSE LLC packet, this embodiment informs a receiver by which a service guide solution of the NIT/SIT is transported. An example of the service guide solution may include OMA BCAST, DVB Convergence of Broadcast and Mobile Service (CBMS), and 3GPP Multimedia Broadcast Multicast Services (MBMS) SA. Other operations are the same as those of the second embodiment.

In the following, NIT will be defined by Table 1, and SIT will be defined by Table 3 and Table 5.

Table 1 illustrates an example of an NIT that is conveyed in the GSE LLC packet, and Table 2 illustrates fields in Table 1.

TABLE 1

| Syntax | Number of bits | Identifier |
| --- | --- | --- |
| Network_Information section( ) { | | |
|   NGH_system_id | 16 | uimsbf |
|   cell_id | 16 | uimsbf |
|   number_RF | 3 | uimsbf |
|   for (i=0; i<number_RF; i++) { | | |
|     RF_id | 3 | uimsbf |
|     bandwidth | 4 | uimsbf |
|     transmission_mode | 3 | uimsbf |
|   guard_interval | 4 | uimsbf |
|     common_clock_reference_id | 4 | uimsbf |
|     in_band_flag | 1 | uimsbf |
|     if (in_band_flag){ | | |
|       ngh_slot_length | 12 | uimsbf |
|       ngh_slot_interval | 24 | uimsbf |
|     } | | |
|   } | | |
|   number_of_LNC | 3 | uimsbf |
|   for (i=0; i<number_of_LNC; i++){ | | |
|     RF_main; | 3 | uimsbf |
|   n of_PLP; | 8 | uimsbf |
|     for (j=0; j<nof_PLP; j++){ | | |
|       PLP_id; | 8 | uimsbf |
|     } | | |
|   } | | |
| } | | |

TABLE 2

| Fields | Definitions |
| --- | --- |
| NGH_system_id | A field indicating an ID of an NGH network |
| cell_id | A field indicating an ID of an NGH cell |
| number_RF | A field indicating the number of radio frequencies (RFs) existing in a cell indicated by a Cell ID |
| RF_id | A field indicating an RF ID |
| bandwidth | A field indicating an RF transmission band |
| transmission_mode | A field indicating an NGH transmission mode |
| guard_interval | A field indicating a guard interval between OFDM cells |
| common_clock_reference_id | A field indicating an identifier of a common clock used in the system |
| in_band_flag | A field indicating use/nonuse of in-band signaling |
| ngh_slot_length | A field indicating current slot length corresponding to the number of OFDM cells |
| ngh_slot_interval | A field indicating the number of T intervals between the current NGH slot and the next slot |
| number_of_LNC | A field indicating the total number of Logical NGH Channels (LNCs) in the current NGH system |
| RF_main; | A field indicating the main RF |
| nof_PLP; | A field indicating the number of PLPs in the current LNC |
| PLP_id; | A field indicating a PLP ID |

Table 3 illustrates an example of an SIT that is conveyed in the GSE LLC packet, and Table 4 illustrates fields in Table 3.

TABLE 3

| Syntax | Number of bits | Identifier |
|---|---|---|
| service association section( ) { | | |
|     section_length | 32 | uimsbf |
|     number_of_services | 8 | uimsbf |
|     for (i=0; i<N; i++){ | | |
|         number_of_components | 8 | bslbf |
|         for (j=0; j<N1; j++) { | | |
|             URL_length | 8 | bslbf |
|             for (k=0; k<N2; k++) { | | |
|                 URL_byte or IP address + port number | 8 | uimsbf |
|             } | | |
|         context_id | 8 or 16 | uimsbf |
|         context_profile | 8 | uimsbf |
|         static_info_length | 8 | uimsbf |
|         for (l=0; l<N3; l++) { | | |
|             static chain byte( ) | 8 | bslbf |
|         } | | |
|         Anchor_flag | 1 | uimsbf |
|         PLP_id | 8 | uimsbf |
|         MIMO_mode | 2 | uimsbf |
|         RFU | 5 | uimsbf |
|     } | | |
|     T_INT_APLPF | 16 | uimsbf |
|     BS_APLPF | 24 | uimsbf |
|     } | | |
|     CRC_byte | 32 | uimsbf |
| } | | |

TABLE 4

| Fields | Definitions |
|---|---|
| section length | A field indicating a length of a section |
| number of services | A field indicating the number of broadcast services delivered on the current channel |
| number of components | A field indicating the number of components delivered through the broadcast service in a broadcast service loop |
| Uniform Resource Locator (URL) length | A field indicating a length of a "URL_byte or IP address + port number" field indicating each component |
| URL_byte or IP address + port number | A text byte field (IP address + port number) of a URL_byte value indicating each component, or an IP address indicating an IP channel on which each component is transmitted, and a port number. |
| context id | A field indicating a CID of a compressed IP stream |
| context profile | A field indicating a context profile of a compressed IP stream |
| static info length | A field indicating a length of a static chain byte sequence |
| static chain byte | A field indicating a byte sequence which is static information of a compressed IP stream |
| Anchor Flag | A field indicating that PLP is an anchor of all PLPs associated with a given broadcast service |
| PLP ID | A field indicating a PLP ID to which the component is delivered |
| MIMO_MODE | A field indicating use of Single Input Single Output (SISO)/Multiple Input Multiple Output (MIMO) structure |
| T_INT_APLPF | A field indicating a time (in milliseconds or Orthogonal Frequency Division Multiplexing (OFDM) symbols) between two consecutive frames of all broadcast service-related PLPs |
| BS_APLPF | A field indicating the maximum buffer size (e.g., the maximum size of a frame of the allocated PLPs) in OFDM cells |
| CRC byte | A field indicating a CRC byte of a related session |

Table 5 illustrates another example of an SIT that is conveyed in the GSE LLC packet, and Table 6 illustrates fields in Table 5.

While the SIT in Table 3 is configured to provide required information on the basis of the NGH broadcast service, the SIT in Table 5 is configured to provide required information on the basis of the PLP which is provided in the NGH network. The PLP has its identifier and its unique value in the NGH system within the NGH network. Since the PLP may collectively convey all the data requiring the same physical characteristics, elements (such as video, audio, and data) constituting an NGH broadcast service may be conveyed in the same PLP, if they require the same physical characteristics. The information (such as Anchor float, MIMO Mode, and time interleaver memory) that is provided in Table 3 in association with the PLP is provided by L1 signaling, so this information is omitted in Table 5.

TABLE 5

| Syntax | Number of bits | Identifier |
|---|---|---|
| service_information_table( ) { | | |
|     table_length | 32 | uimsbf |
|     system_id | 16 | uimsbf |
|     number_of_plps | 8 | uimsbf |
|     for ($i_1$=0; $i_1$<$N_1$; $i_1$++) { | | |
|         plp_id | 8 | uimsbf |
|         number_of_service_components_per_plp | 8 | uimsbf |
|         for ($i_2$=0; $i_2$<$N_2$; $i_2$++) { | | |
|             URI_length | 8 | uimsbf |
|             for ($i_3$=0; $i_3$<$N_3$; $i_3$++) { | | |
|                 URI_byte or IP address + port number | 8 | uimsbf |
|             } | | |

TABLE 5-continued

| Syntax | Number of bits | Identifier |
|---|---|---|
| ROHC_context_id | 16 | uimsbf |
| ROHC_context_profile | 8 | uimsbf |
| ROHC_static_info_length | 8 | uimsbf |
| for (i₄=0; i₄<N₄; i₄++) { | | |
| ROHC_static_chain_byte | 8 | uimsbf |
| } | | |
| Reserved | 8 | uimsbf |
| } | | |
| CRC_byte | 32 | uimsbf |
| } | | |

TABLE 6

| Fields | Definitions |
|---|---|
| table length | A field indicating a length of the table |
| System ID | An identifier of an NGH system where PLPs are transported |
| Number_of_plps | A field indicating the number of PLPs used in the System ID |
| number of Service_components_per_plp | A field indicating the number of components delivered on a PLP |
| URL length | A field indicating a length of a "URL_byte or IP address + port number" field indicating each component |
| URL_byte or IP address + port number | A text byte field (IP address + port number) of a URL byte value indicating each component, or an IP address indicating an IP channel on which each component is transmitted, and a port number |
| Robust Header Compression (ROHC)_context id | A field indicating a Context IDentification (CID) of a compressed IP stream |
| ROHC_context profile | A field indicating a context profile of a compressed IP stream |
| ROHC_static info length | A field indicating a length of a static chain byte sequence |
| ROHC_static chain byte | A field indicating a byte sequence which is static information of a compressed IP stream |
| Cyclic Redundancy Check (CRC) byte | A field indicating a CRC byte of a related session |

Figure 8:
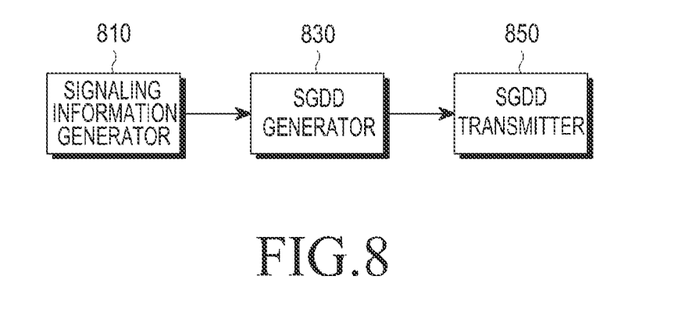
FIG. 8 illustrates an apparatus which transmits signaling information in a digital broadcasting system according to an embodiment of the present invention.

FIG. 8 illustrates an apparatus which transmits signaling information in a digital broadcasting system according to an embodiment of the present invention.

Referring to FIG. 8, a signaling information generator 810 generates the NIT illustrated in Table 1, and generates the SIT illustrated in Tables 3 and 5.

An SGDD generator 830 generates an SGDD including the generated NIT and SIT, and an SGDD transmitter 850 transmits the generated SGDD to a receiving apparatus.

While signaling information including the NIT and SIT based on the second embodiment of the present invention is transported in an SGDD, signaling information including the NIT and SIT based on the first embodiment of the present invention is directly inserted into a payload of a GSE packet during its transmission, and signaling information including the NIT and SIT based on the third embodiment of the present invention is inserted into an extension header of a GSE packet during its transmission.

Although it is assumed in FIG. 8 that the signaling information generator 810, the SGDD generator 830 and the SGDD transmitter 850 are implemented as separate units, it will be apparent to those of ordinary skill in the art that they may be implemented in a single unit.

Figure 9:
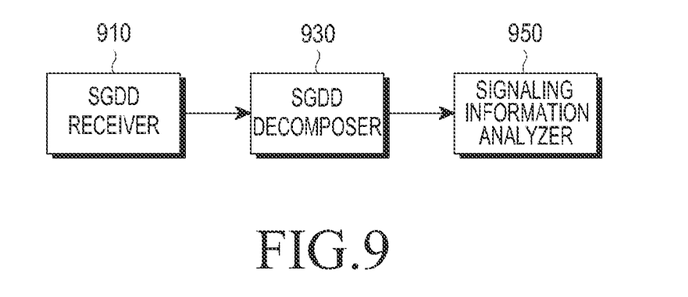
FIG. 9 illustrates an apparatus which receives signaling information in a digital broadcasting system according to an embodiment of the present invention.

FIG. 9 illustrates an apparatus which receives signaling information in a digital broadcasting system according to an embodiment of the present invention.

Referring to FIG. 9, an SGDD receiver 910 receives an SGDD transmitted from a transmitting apparatus, and forwards it to an SGDD decomposer 930 which decomposes the received SGDD into the NIT and SIT included in signaling information, and delivers them to a signaling information analyzer 950 that analyzes the NIT and SIT.

While signaling information including the NIT and SIT based on the second embodiment of the present invention is inserted into an SGDD during its reception, signaling information including the NIT and SIT based on the first embodiment of the present invention is directly inserted into a payload of a GSE packet during its reception, and signaling information including the NIT and SIT based on the third embodiment of the present invention is directly inserted into an extension header of a GSE packet during its reception.

Although in FIG. 9 the SGDD receiver 910, the SGDD decomposer 930 and the signaling information analyzer 950 are implemented as separate units, it will be apparent to those of ordinary skill in the art that they may be implemented in a single unit. The SGDD decomposer 930 and the signaling information analyzer 950 may be implemented as a controller.

Figure 10:
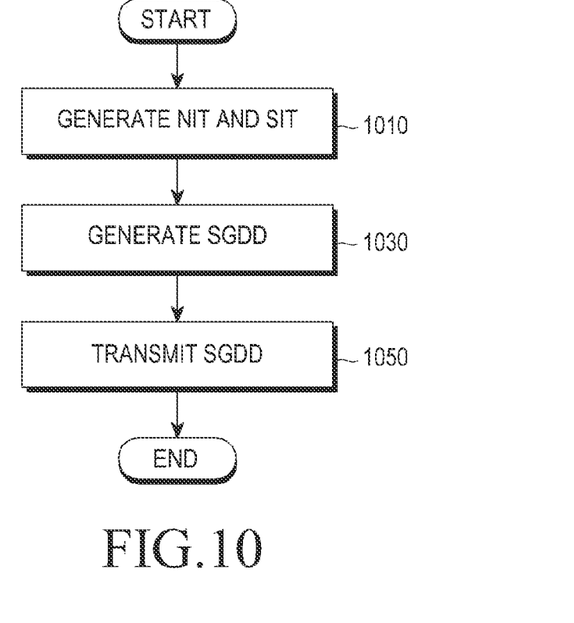
FIG. 10 is a flowchart illustrating an operation of transmitting signaling information in a digital broadcasting system according to an embodiment of the present invention.

FIG. 10 is a flowchart illustrating an operation of transmitting signaling information in a digital broadcasting system according to an embodiment of the present invention.

Referring to FIG. 10, in step 1010, the signaling information generator 810 generates the NIT illustrated in Table 1, and generates the SIT illustrated in Tables 3 and 5.

The SGDD generator 830 generates an SGDD including the generated NIT and SIT in step 1030, and an SGDD transmitter 850 transmits the generated SGDD to a receiving apparatus in step 1050.

While signaling information including the NIT and SIT based on the second embodiment of the present invention is transported in an SGDD, signaling information including the NIT and SIT based on the first embodiment of the present invention is directly inserted into a payload of a GSE packet during its transmission, and signaling information including the NIT and SIT based on the third embodiment of the present invention is inserted into an extension header of a GSE packet during its transmission.

Figure 11:
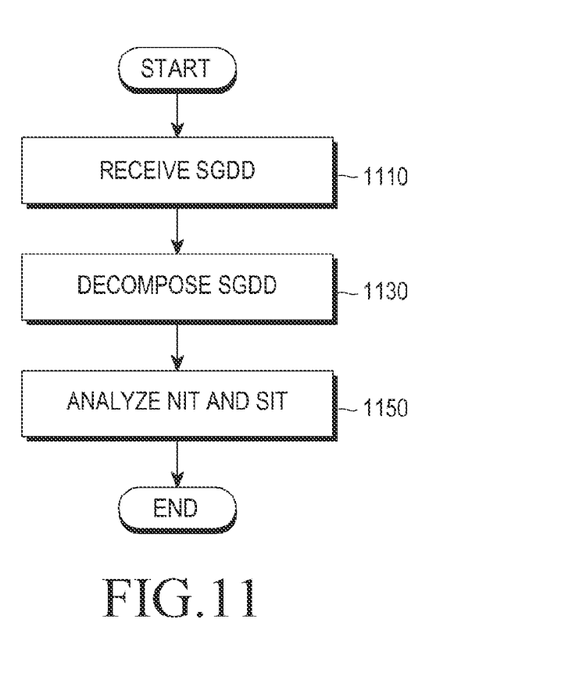
FIG. 11 is a flowchart illustrating an operation of receiving signaling information in a digital broadcasting system according to an embodiment of the present invention.

FIG. 11 is a flowchart illustrating an operation of receiving signaling information in a digital broadcasting system according to an embodiment of the present invention.

Referring to FIG. 11, if the SGDD receiver 910 receives an SGDD transmitted from a transmitting apparatus in step 1110, the SGDD decomposer 930 decomposes the received SGDD into the NIT and SIT included in signaling information in step 1130. In step 1150, the signaling information analyzer 950 analyzes the NIT and the SIT.

While signaling information including the NIT and SIT based on the second embodiment of the present invention is inserted into an SGDD during its reception, signaling information including the NIT and SIT based on the first embodiment of the present invention is directly inserted into a payload of a GSE packet during its reception, and signaling information including the NIT and SIT based on the third embodiment of the present invention is directly inserted into an extension header of a GSE packet during its reception.

Embodiments of the present invention may be implemented as computer-readable codes in computer-readable recording media. The computer-readable recording media may include various types of recording devices storing computer-readable data. Examples of the computer-readable recording media may include Read Only Memory (ROM), Random Access Memory (RAM), Compact Disk Read Only Memory (CD-ROM), magnetic tape, floppy disk, and an optical data storage device.

As is apparent from the foregoing description, embodiments of the present invention properly transmit the information required for reception of a broadcast service when the broadcast service is provided using GSE in a digital broadcasting system.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method which transmits signaling information for reception of a broadcast service in a digital broadcasting system, comprising:
    generating signaling information that includes:
        a network information table indicating information about a transport network over which broadcast service data is transmitted, and
        a service information table indicating at least one broadcast service and information about at least one physical layer pipe (PLP) mapped to the at least one broadcast service; and
    transmitting the signaling information in a generic stream encapsulation (GSE) packet,
    wherein the network information table includes:
        a field indicating a bandwidth of the radio frequency,
        a field indicating a transmission mode,
        a field indicating a guard interval between orthogonal frequency division multiplexing (OFDM) cells, and
        a field indicating an identifier of a common clock used in the system, and wherein the service information table includes:
            a field indicating a context identification (CID) of a compressed internet protocol (IP) stream.

2. The method of claim 1, wherein the GSE packet includes a protocol type field which indicates a protocol type of a protocol data unit (PDU) that is conveyed in a data field of the GSE packet, and indicates whether an extension header is present in the GSE packet.

3. The method of claim 1, wherein the signaling information is directly inserted into a payload of the GSE packet.

4. The method of claim 1, wherein the signaling information is inserted into a service guide delivery descriptor (SGDD).

5. The method of claim 1, wherein the signaling information is inserted into an extension header of the GSE packet.

6. The method of claim 1, wherein the network information table includes:
    an identifier (ID) field of a network that transmits a broadcast service in the GSE packet,
    a field indicating an ID for a cell receiving a broadcast service in the GSE packet and for cells around the cell,
    a field indicating a number of radio frequencies that exist in a cell indicated by the field indicating an ID,
    a field indicating an ID of the radio frequency,
    a field indicating whether in-band signaling is used,
    a field indicating a length of a current slot, which corresponds to a number of OFDM cells,
    a field indicating a number of intervals between a current slot and a next slot,
    a field indicating a number of logical next generation handheld (NGH) Channels (LNCs),
    a field indicating a main radio frequency,
    a field indicating a number of PLPs in a current LNC, and
    a field indicating an ID of the PLP.

7. The method of claim 1, wherein the service information table includes:
    a field indicating a length of the table,
    a field indicating an identifier of a system where PLPs are transmitted,
    a field indicating a number of PLPs used in the identifier of a system,
    a field indicating a number of components which are delivered on a PLP,
    a field indicating a length of a "uniform resource locator (URL)_byte or IP address+port number" field indicating each component,
    a text byte field of 'IP address+port number', which indicates a URL_byte value indicating each component, or an IP channel on which each component is transmitted,
    a field indicating a context profile of a compressed IP stream,
    a field indicating a length of a static chain byte sequence,
    a field indicating a byte sequence which is static information of a compressed IP stream, and
    a field indicating a cyclic redundancy check (CRC) byte of a related session.

8. An apparatus which transmits signaling information for reception of a broadcast service in a digital broadcasting system, comprising:
    a signaling information generator which generates signaling information that includes:
        a network information table indicating information about a transport network over which broadcast service data is transmitted, and
        a service information table indicating at least one broadcast service and information about at least one physical layer pipe (PLP) mapped to the at least one broadcast service; and
    a transmitter which transmits the signaling information in a generic stream encapsulation (GSE) packet,
    wherein the network information table includes:
        a field indicating a bandwidth of the radio frequency,
        a field indicating a transmission mode,
        a field indicating a guard interval between orthogonal frequency division multiplexing (OFDM) cells, and
        a field indicating an identifier of a common clock used in the system, and wherein the service information table includes:
            a field indicating a context identification (CID) of a compressed internet protocol (IP) stream.

9. The apparatus of claim 8, wherein the GSE packet includes a protocol type field which indicates a protocol type of a protocol data unit (PDU) that is conveyed in a data field of the GSE packet, and indicates whether an extension header is present in the GSE packet.

10. The apparatus of claim 8, wherein the signaling information is directly inserted into a payload of the GSE packet.

11. The apparatus of claim 8, wherein the signaling information is inserted into a service guide delivery descriptor (SGDD).

12. The apparatus of claim 8, wherein the signaling information is inserted into an extension header of the GSE packet.

13. The apparatus of claim 8, wherein the network information table includes:
an identifier (ID) field of a network that transmits a broadcast service in the GSE packet,
a field indicating an ID for a cell receiving a broadcast service in the GSE packet and for cells around the cell,
a field indicating a number of radio frequencies that exist in a cell indicated by the field indicating an ID,
a field indicating an ID of the radio frequency,
a field indicating whether in-band signaling is used,
a field indicating a length of a current slot, which corresponds to a number of OFDM cells,
a field indicating a number of intervals between a current slot and a next slot,
a field indicating a number of logical next generation handheld (NGH) channels (LNCs),
a field indicating a main radio frequency,
a field indicating a number of PLPs in a current LNC, and
a field indicating an ID of the PLP.

14. The apparatus of claim 8, wherein the service information table includes:
a field indicating a length of the table,
a field indicating an identifier of a system where PLPs are transmitted,
a field indicating a number of PLPs used in the identifier of a system,
a field indicating a number of components which are delivered on a PLP;
a field indicating a length of a "uniform resource locator (URL)_byte or IP address+port number" field indicating each component,
a text byte field of 'IP address+port number', which indicates a URL_byte value indicating each component, or an IP channel on which each component is transmitted,
a field indicating a context profile of a compressed IP stream,
a field indicating a length of a static chain byte sequence,
a field indicating a byte sequence which is static information of a compressed IP stream, and
a field indicating a cyclic redundancy check (CRC) byte of a related session.

15. A method which receives signaling information for reception of a broadcast service in a digital broadcasting system, comprising:
receiving signaling information in a generic stream encapsulation (GSE) packet from a transmitting apparatus;
analyzing the signaling information; and
extracting, from the signaling information, a network information table indicating information about a transport network over which broadcast service data is transmitted, and a service information table indicating at least one broadcast service and information about at least one physical layer pipe (PLP) mapped to the at least one broadcast service,
wherein the network information table includes:
a field indicating a bandwidth of the radio frequency,
a field indicating a transmission mode,
a field indicating a guard interval between orthogonal frequency division multiplexing (OFDM) cells, and
a field indicating an identifier of a common clock used in the system, and wherein the service information table includes:
a field indicating a context identification (CID) of a compressed interne protocol (IP) stream.

16. The method of claim 15, wherein the GSE packet includes a protocol type field which indicates a protocol type of a protocol data unit (PDU) that is conveyed in a data field of the GSE packet, and indicates whether an extension header is present in the GSE packet.

17. The method of claim 15, wherein the signaling information is directly inserted into a payload of the GSE packet.

18. The method of claim 15, wherein the signaling information is inserted into a service guide delivery descriptor (SGDD).

19. The method of claim 15, wherein the signaling information is inserted into an extension header of the GSE packet.

20. The method of claim 15, wherein the network information table includes:
an identifier (ID) field of a network that transmits a broadcast service in the GSE packet,
a field indicating an ID for a cell receiving a broadcast service in the GSE packet and for cells around the cell,
a field indicating a number of radio frequencies that exist in a cell indicated by the field indicating an ID,
a field indicating an ID of the radio frequency,
a field indicating whether in-band signaling is used,
a field indicating a length of a current slot, which corresponds to a number of OFDM cells,
a field indicating a number of intervals between a current slot and a next slot,
a field indicating a number of logical next generation handheld (NGH) channels (LNCs),
a field indicating a main radio frequency,
a field indicating a number of PLPs in a current LNC, and
a field indicating an ID of the PLP.

21. The method of claim 15, wherein the service information table includes:
a field indicating a length of the table,
a field indicating an identifier of a system where PLPs are transmitted,
a field indicating a number of PLPs used in the identifier of a system,
a field indicating a number of components which are delivered on a PLP,
a field indicating a length of a "uniform resource locator (URL)_byte or IP address+port number" field indicating each component,
a text byte field of 'IP address+port number', which indicates a URL_byte value indicating each component, or an IP channel on which each component is transmitted,
a field indicating a context profile of a compressed IP stream,
a field indicating a length of a static chain byte sequence,
a field indicating a byte sequence which is static information of a compressed IP stream, and
a field indicating a cyclic redundancy check (CRC) byte of a related session.

22. An apparatus which receives signaling information for reception of a broadcast service in a digital broadcasting system, comprising:
- a receiver which receives signaling information in a generic stream encapsulation (GSE) packet; and
- a controller which analyzes the signaling information, and extracts, from the signaling information, a network information table indicating information about a transport network over which broadcast service data is transmitted, and a service information table indicating at least one broadcast service and information about at least one physical layer pipe (PLP) mapped to the at least one broadcast service, wherein the network information table includes:
- a field indicating a bandwidth of the radio frequency,
- a field indicating a transmission mode,
- a field indicating a guard interval between orthogonal frequency division multiplexing (OFDM) cells, and
- a field indicating an identifier of a common clock used in the system, and wherein the service information table includes:
- a field indicating a context identification (CID) of a compressed internet protocol (IP) stream.

23. The apparatus of claim 22, wherein the GSE packet includes a protocol type field which indicates a protocol type of a protocol data unit (PDU) that is conveyed in a data field of the GSE packet, and indicates whether an extension header is present in the GSE packet.

24. The apparatus of claim 22, wherein the signaling information is directly inserted into a payload of the GSE packet.

25. The apparatus of claim 22, wherein the signaling information is inserted into a service guide delivery descriptor (SGDD).

26. The apparatus of claim 22, wherein the signaling information is inserted into an extension header of the GSE packet.

27. The apparatus of claim 22, wherein the network information table includes:
- an identifier (ID) field of a network that transmits a broadcast service in the GSE packet,
- a field indicating an ID for a cell receiving a broadcast service in the GSE packet and for cells around the cell,
- a field indicating a number of radio frequencies that exist in a cell indicated by the field indicating an ID,
- a field indicating an ID of the radio frequency,
- a field indicating whether in-band signaling is used,
- a field indicating a length of a current slot, which corresponds to a number of OFDM cells,
- a field indicating a number of intervals between a current slot and a next slot,
- a field indicating a number of logical next generation handheld (NGH) channels (LNCs),
- a field indicating a main radio frequency,
- a field indicating a number of PLPs in a current LNC, and
- a field indicating an ID of the PLP.

28. The apparatus of claim 22, wherein the service information table includes:
- a field indicating a length of the table,
- a field indicating an identifier of a system where PLPs are transmitted,
- a field indicating a number of PLPs used in the identifier of a system, a field indicating a number of components which are delivered on a PLP,
- a field indicating a length of a "uniform resource locator (URL)_byte or IP address+port number" field indicating each component,
- a text byte field of 'IP address+port number', which indicates a URL_byte value indicating each component, or an IP channel on which each component is transmitted,
- a field indicating a context profile of a compressed IP stream,
- a field indicating a length of a static chain byte sequence,
- a field indicating a byte sequence which is static information of a compressed IP stream, and
- a field indicating a cyclic redundancy check (CRC) byte of a related session.

* * * * *